US012711458B2

(12) United States Patent
Kaila

(10) Patent No.: US 12,711,458 B2
(45) Date of Patent: Aug. 18, 2026

(54) APPARATUS AND METHOD OF ENTITY OVERSIGHT

(71) Applicant: IT By Design, Inc., Colts Neck, NJ (US)

(72) Inventor: Sukhwinder Kaila, Colts Neck, NJ (US)

(73) Assignee: IT By Design, Inc., Colts Neck, NJ (US)

( * ) Notice: Subject to any disclaimer, the term of this patent is extended or adjusted under 35 U.S.C. 154(b) by 0 days.

(21) Appl. No.: 18/808,530

(22) Filed: Aug. 19, 2024

(65) Prior Publication Data

US 2026/0050889 A1 Feb. 19, 2026

(51) Int. Cl.
*G06Q 10/10* (2023.01)

(52) U.S. Cl.
CPC .................................... *G06Q 10/10* (2013.01)

(58) Field of Classification Search
CPC ...................................................... G06Q 10/10
See application file for complete search history.

(56) References Cited

U.S. PATENT DOCUMENTS 10,796,265 B2 10/2020 Muthuswamy
11,126,949 B1 9/2021 Shook
11,755,668 B1 * 9/2023 Stewart ................. G06F 16/951 707/709
2012/0046989 A1 * 2/2012 Baikalov ............ G06Q 10/0635 705/7.28
2017/0169379 A1 * 6/2017 Horseman ............. G06Q 10/00
2021/0241137 A1 * 8/2021 Jain ........................ G16H 10/20
2022/0076834 A1 * 3/2022 Hanlon, Jr. ............ G16H 50/20
2022/0156866 A1 * 5/2022 Dua ..................... G06Q 10/105
2022/0157456 A1 * 5/2022 Luckow ................. G16H 80/00
2022/0318716 A1 10/2022 Dandan
2023/0096720 A1 * 3/2023 Wezowski ......... G06Q 10/0633 705/7.42
2023/0307134 A1 * 9/2023 Marks ................... G16H 50/20

(Continued)

FOREIGN PATENT DOCUMENTS

BR 102023021692 A2 * 5/2024

OTHER PUBLICATIONS

Haiyang Jia, Minhong Wang, Weijia Ran, Stephen J.H. Yang, Jian Liao, Dickson K.W. Chiu. Design of a performance-oriented workplace e-learning system using ontology. 2011. Expert Systems with Applications. vol. 38, Issue 4. pp. 3372-3382. (Year: 2011).*

*Primary Examiner* — Sarah M Monfeldt
*Assistant Examiner* — Karma A El-Chanti
(74) *Attorney, Agent, or Firm* — CALDWELL LLC

(57) ABSTRACT

An apparatus and method for entity oversight, the apparatus including, a processor and a memory communicatively connected to the processor, the memory containing instructions configuring the processor to gather system data, the system data including one or more data profiles, wherein each data profile includes at least previous member data, generate one or more base standards, select one or more outliers from the system data as a function of the one or more base standards, generate one or more outlier modules for each data profile as a function of the selection, modify the system data as a function of the one or more outliers, and modify a graphical user interface as a function of the one or more outlier modules.

16 Claims, 8 Drawing Sheets

(56) References Cited

U.S. PATENT DOCUMENTS

2023/0419232 A1* 12/2023 Kaufmann ....... G06Q 10/06393
2024/0211828 A1* 6/2024 Iwamoto ........ G06Q 10/063112
2024/0220903 A1* 7/2024 Phadnis ........... G06Q 10/06398
2025/0284761 A1* 9/2025 Smith ................ G06Q 10/0639

* cited by examiner

APPARATUS AND METHOD OF ENTITY OVERSIGHT

FIELD OF THE INVENTION

The present invention generally relates to the field of oversight. In particular, the present invention is directed to entity oversight.

BACKGROUND

Current systems utilized for entity oversight are mainly configured for broad oversight and generally do not monitor the actions of each member. In addition, current systems that may monitor the actions of each member are lacking by the input they are capable of receiving and processing.

SUMMARY OF THE DISCLOSURE

In an aspect an apparatus for entity oversight is described. The apparatus includes a processor and a memory communicatively connected to the processor. The memory contains instructions configuring the processor to gather system data, the system data comprising one or more data profiles, wherein each data profile comprises at least previous member data. The memory further contains instructions configuring the process to generate one or more base standards, select one or more outliers from the system data as a function of the one or more base standards, generate one or more outlier modules for each data profile as a function of the selection, modify the system data as a function of the one or more outliers, and modify a graphical user interface as a function of the one or more outlier modules.

In another aspect a method for entity oversight is described. The method includes gathering, by at least a processor, system data, the system data comprising one or more data profiles, wherein each data profile includes at least previous member data. The method further includes generating, by the at least a processor, one or more base standards, selecting, by the at least a processor, one or more outliers from the system data as a function of the one or more base standards and generating by the at least a processor, one or more outlier modules for each data profile as a function of the selection. The method further includes modifying, by the at least a processor, the system data as a function of the one or more outliers and modifying, by the at least a processor, a graphical user interface as a function of the one or more outlier modules.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for an apparatus and method for entity oversight. In an embodiment, apparatus includes a processor and a memory communicatively connected to the processor. In an embodiment, apparatus is configured to gather system data and generate one or more base standards. In an embodiment, apparatus is configured to select one or more outliers and generate one or more outlier modules.

Aspects of the present disclosure can be used to select outliers associated with an individual. Aspects of the present disclosure can also be used to generate outlier modules that may help an individual minimize a base deviation associated with their outliers. Exemplary embodiments illustrating aspects of the present disclosure are described below in the context of several specific examples.

Figure 1:
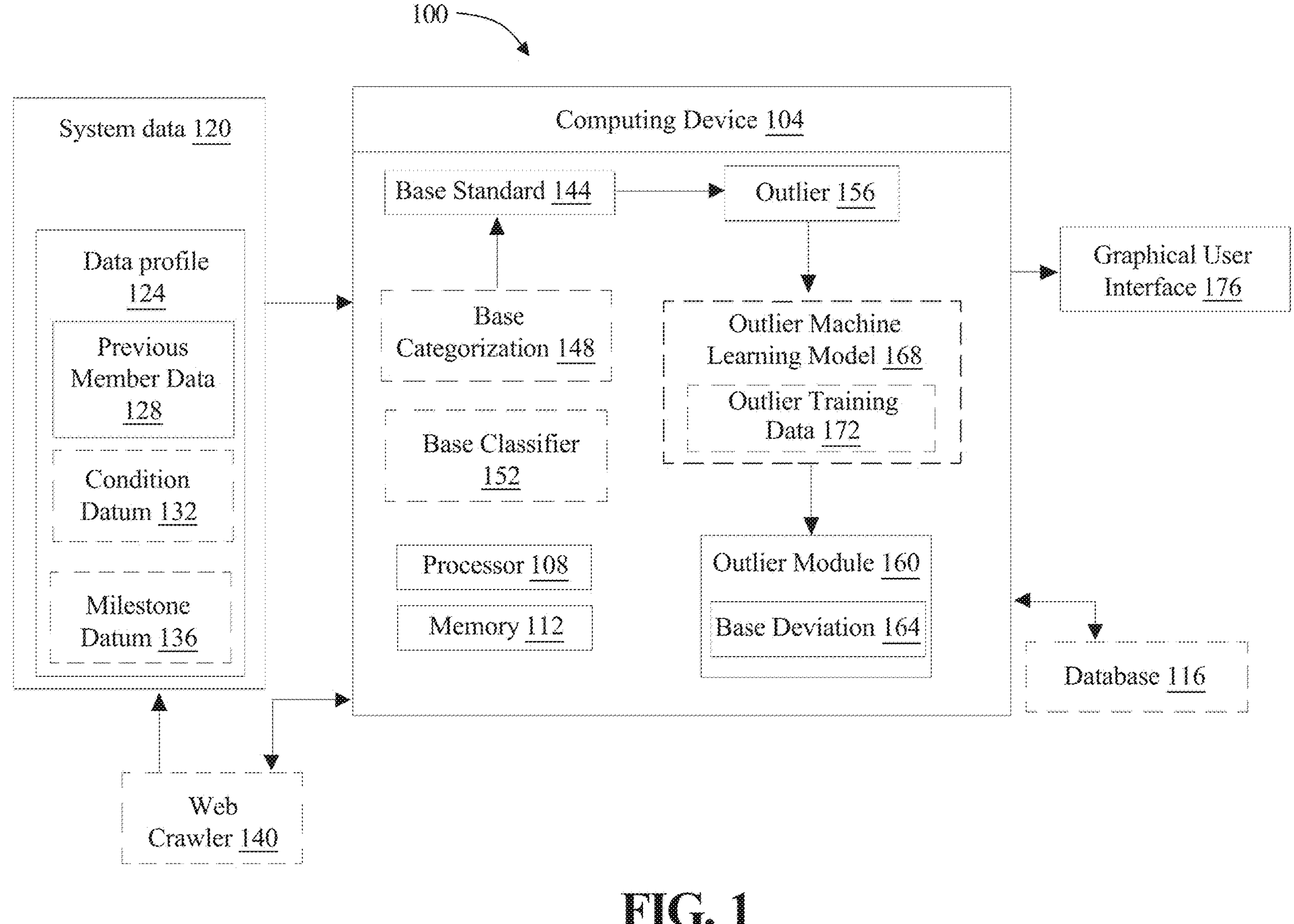
FIG. 1 is a block diagram of an exemplary embodiment of an apparatus for entity oversight.

Referring now to FIG. 1, apparatus 100 for entity oversight is described. "Entity" for the purposes of this disclosure, is an organization comprised of one or more persons with a specific purpose. An entity may include a corporation, organization, business, group one or more persons, and the like. "Entity oversight" for the purposes of this disclosure, refers to the oversight of the entity. For example, entity oversight may include the monitorization and/or oversight of one or more individuals associated with the entity. This may include, but is not limited to, employees, potential employees, independent contractors, shareholders and the like.

With continued reference to FIG. 1, apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a database 116. Database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, processor 108 is configured to receive system data 120. "System data," for the purposes of this disclosure, is information relating to individuals that are associated with an entity. For example, system data 120 may include information associated with employees of a particular entity. System data 120 may further include information associated with potential prospects of the entity such as potential employees. In some cases, system data 120 may further include any information about one or more individuals and/or employees of a particular entity.

With continued reference to FIG. 1, system data 120 includes one or more data profiles 124. "Data profile" for the purposes of this disclosure, is information about a particular individual associated with the entity. For example, data profile 124 may include the individual's name, address, age, employment status, employment position and the like. In some cases, system data 120 may include one or more data profiles 124 wherein the one or more data profiles 124 correspond to one or more individuals. In some cases, data profile 124 may include basic information about the individual such as age, background information, financial information (e.g., credit score, credit history, income, assets, liabilities, stocks, etc.), educational history (e.g., courses completed, colleges graduated, degrees or certification earned etc.), work history (previous employment, time of each employment, employment positions, etc.) and the like. In some cases, data profile 124 may further include an individual's current salary, current number of sick days, sick days taken, vacation days, vacation days taken, employee tardiness, employee absences, and the like. In some cases, data profile 124 may further include warning given to the employee, disciplinary proceedings on the individual and the like. Ins some cases, data profile 124 may further include calendar data of the individual's schedule, the work product of the employee (e.g., work done, quality of the work, etc.), and the like. Data profile 124 may further include social and/or communicative interactions of an individual with other individuals within the entity, recognition from coworkers that the employee has received, recognition the individual has given to others, negative comments made about the employee, negative comments made by the employee and the like. In some cases, data profile 124 may further include information about an individual's family and social life such as, for example, whether the individual has a spouse or children, whether the individual is close to their family, whether the individual has friends, whether the individual has a bucket list, what the individual does recreationally and the like.

With continued reference to FIG. 1, data profile 124 may further include previous member data 128. "Previous member data" for the purposes of this disclosure, is any information within data profile 124 that was received prior to the receipt of data profile 124. For example, previous member data 128 may include data profile 124 of an employee on a previous day, month, or year. In some cases, previous member data 128 may include previous iterations of data profile 124. Previous member data 128 may further include data generated by the processing of a previous data profile 124. In some cases, previous member data 128 may be retrieved from database. In some cases, previous member data 128 is described in further detail below.

With continued reference to FIG. 1, data profile 124 may include condition datum 132. "Condition datum" for the purposes of this disclosure, is information describing an individual's mental or physical health status. Condition datum 132 may include information indicating an individual may be suffering from depression, anxiety, stress, and the like. Condition datum 132 may further include an individual suffering from a lack of sleep, the individual has social anxiety, the individual has one or more fears, and the like. In some cases, condition datum 132 may include information associated with an individual's mental health such as whether the individual is happy, sad, social, antisocial, and the like. In some cases, condition datum 132 may further include an individual's physical health status such as, but not limited to information about a particular physical ailment, the individual's body mass index, whether the individual exercises, medications taken by the user, and the like. In some cases, condition datum 132 may further include information about an individual's spiritual life. This may include whether the individual is a religious individual, whether the individual believes they have meaning or purposes, and any other information that may be indicative of spiritual life. In some cases, condition datum may be received through one or more wearable devices, such as but not limited to, wrist-based heart monitor, a wearable oximeter, a wearable temperature monitor, a wrist based heart pressure, monitor, a sleep tracking device, and the like.

With continued reference to FIG. 1, data profile 124 may include milestone datum 136. "Milestone datum" for the purposes of this disclosure, is information about a user's goals or aspirations over a particular time period. For example, milestone datum 136 may include a user's goal to become healthier wherein milestone datum 136 may include information of a user's plan to achieve the goal over the next year, 5 years, 10 years, 15, years, 25 years, and/or the like. In some cases, milestone datum 136 may include one or more milestone categories wherein each milestone category may include a goal within a particular field. Milestone categories may include health (such as but not limited to, plan to increase health, well-being fitness, mental health, happiness, to increase spiritual life etc.), family (such as, but not limited to, plans associated with spouse and family such as spending more time with family or growing family, plans associated with increasing social life such as achieving items on a bucket list or increasing recreational activities and the like), career (such as, but not limited to, plans to improve work-life balance, plans to improve financial life and retirement, plans to increase educational understanding of one or more topics and the like.), legacy (such as, but not limited to, plans to provide community service and focus on others, plans to leave behind a legacy or leave behind something of impact to society and the like) and the like.

With continued reference to FIG. 1, one or more elements within system data 120 may contain an associated quantitative element. "Quantitative element" for the purposes of this disclosure is a datum that is representative of a numerical score for one or more elements within system data 120. The associated quantitative element may include a number that is representative of a particular degree of one or more elements. For example, an individual's happiness described within data profile 124 may contain a corresponding quantitative element of 4 depicting a user's happiness on a range from 1-5. In some cases, the quantitative element may be used to rate one or more elements within system data 120. for example, an element describing an employee evaluation may include an associated quantitative element wherein the quantitative element may indicate an employee's evaluation on a given range. In some cases, each quantitative element may be used to rate one or more elements within system data 120. the rating may be used to indicate a high rating, a low rating, a good rating, a bad rating and the like. For example, on a range of 1-5, a quantitative element of 1, may indicate a low or bad rating whereas a quantitative element of 5 may indicate a high or good rating. In some cases, each quantitative element may be received by an individual, a user, other individuals within the entity and the like as described below.

With continued reference to FIG. 1, system data 120 may be received by processor 108 through user input. For example, a user associated with the entity may be tasked with inputting system data 120. In some cases, system data 120 may be received by one or more individuals associated with the entity. For example, a particular data profile 124 may be inputted by the individual in which the data profile 124 is associated with. In some cases, each individual may input their own data profile 124 or elements thereof. In some cases, each individual may be tasked with inputting one or more elements of other data profiles 124. For example, an individual may be tasked with rating other individuals' social interactions, work product and the like. In some cases, data profile 124 may be received from third party sources such as a database belonging to the entity, a software containing information associated with the entity and the like. In some cases, receiving system data 120 may include one or more documents and/or files from a user.

With continued reference to FIG. 1, system data 120 may include data from files or documents that have been converted in machine-encoded test using an optical character reader (OCR). For example, a user may input digital records and/or scanned physical documents that have been converted to digital documents, wherein system data 120 may include data that have bene converted into machine readable text. In some embodiments, optical character recognition or optical character reader (OCR) includes automatic conversion of images of written (such as, but not limited to, typed, handwritten, or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases, OCR may be an "offline" process, which analyses a static document or image frame. In some cases, handwriting movement analysis can be used as input for handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image components. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to the image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of the image component. In some cases, binarization may be required for example if an employed OCR algorithm only works on binary images. In some cases, a line removal process may include the removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify a script allowing an appropriate OCR algorithm to be selected. In some cases, a character isolation or "segmentation" process may separate signal characters, for example, character-based OCR algorithms. In some cases, a normalization process may normalize the aspect ratio and/or scale of the image component.

Still referring to FIG. 1, in some embodiments, an OCR process will include an OCR algorithm. Exemplary OCR algorithms include matrix-matching process and/or feature extraction processes. Matrix matching may involve comparing an image to a stored glyph on a pixel-by-pixel basis. In some cases, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 5-7. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. The second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 3, 4, and 5.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make use of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, system data 120 may be generated using a web crawler 140. A "web crawler," as used herein, is a program that systematically browses the internet for the purpose of Web indexing. The web crawler 140 may be seeded with platform URLs, wherein the crawler may then visit the next related URL, retrieve the content, index the content, and/or measures the relevance of the content to the topic of interest. In some embodiments, computing device 104 may generate a web crawler 140 to compile system data 120. The web crawler 140 may be seeded and/or trained with websites, such as social media websites associated an individual to begin the search. This may include, but is not limited to social media websites where the individual may have a social media profile, job networking sites, government sites, educational institutions that may have information about the individual's attendance and the like. A web crawler 140 may be generated by computing device 104. In some embodiments, the web crawler 140 may be trained with information received from a user through a user interface. In some embodiments, the web crawler 140 may be configured to generate a web query. A web query may include search criteria received from a user. For example, a user may submit a plurality of websites for the web crawler 140 to search to extract any data suitable for system data 120.

In some cases, system data 120 may be received through an online form and/or a questionnaire, wherein the online form may contain one or more questions and comment boxes for a user to populate. In some cases, the online form may contain prepopulated answers wherein a user may select from the populated answers. For example, the online form may indicate to a user to rate an answer from 1-5 wherein a user may be prompted to select a number from 1-5. In some cases, each individual within an entity may be tasked with filling out the online form wherein the online form may contain one or more questions that are configured to receive one or more elements of system data 120 and/or data profile 124. In some cases, an individual may be tasked with filling out evaluations of other individuals wherein the evaluations may be received as data profile 124 for another individual. In some cases, answers populated within the online form may be sorted into one or more categorizations. In some cases, answers from the online form may be received as a spreadsheet wherein the answers may be sorted within the spreadsheet. In some cases, each question or prompt on the online form may be categorized wherein a particular answer to the question or prompt may be inputted into the corresponding category. In some cases, the form may be offline wherein an individual may be tasked within filling out the form and transmitting the completed form to another individual or to a database. Additionally or alternatively, system data 120, data profile 124 and/or elements thereof may be received by a chatbot system. A "chatbot system" for the purposes of this disclosure, is a program configured to simulate human interaction with a user with a user in order to receive or convey information. In some cases, chatbot system may be configured to receive system data 120 and/or elements thereof through interactive questions presented to the user. the questions may include, but are not limited to, questions such as "What is your name?", "What is your date of birth?", "what is your employment status?" and the like. In some cases, computing device 104 may be configured to present a comment box through a user interface wherein a user may interact with the chatbot and answer the questions through input into the chat box. In some cases, questions may require selection of one or more pre-configured answers. For example, chatbot system may ask a user to select the appropriate salary range corresponding to the user, wherein the user may select the appropriate range from a list of pre-configured answers. In situations where answers are limited to limited responses, chatbot may be configured to display checkboxes wherein a user may select a box that is most associated with their answer. In some cases, chatbot may be configured to receive system data 120 or data profile 124 through an input. In some cases, each question may be assigned to a particular categorization wherein a response to the question may be assigned to the same categorization. For example, a question prompting a user to input an income may be assigned to an income categorization wherein a response from the user may also be assigned to the income categorization.

With continued reference to FIG. 1, processor 108 is configured to generate one or more base standards 144. "Base standard" for the purposes of this disclosure, is a numerical element or a range of numerical elements wherein comparison of a datum to the numerical element or range of numerical elements may be determinative of a fact. For example, a datum indicating an individual contains a particular happiness level may be compared to base standard 144 wherein datum falling short of the numerical element or falling outside of the range may indicate that the datum does not satisfy the base standard 144. In some cases, base standards 144 may comprise a threshold, wherein datum falling short of the threshold or outside the range of the threshold may be determinative of a fact. In some cases, one or more base standards 144 may include numerical ranges or thresholds of one or more elements within system data 120. In some cases, one or more base standards 144 may include base categorizations 148 wherein each base standard 144 is associated with a base categorization 148. Base categorization 148 is a grouping of similar elements within system data 120 that when combined may be used to generate a datum that may be compared to base standard 144. For example, base categorization 148 may include employee social skills wherein any element within system data 120 and/or data profile 124 that may be indicative of an individual's social skills may be grouped in a similar grouping. In some cases, base categorization 148 may include social skills, family life, communicative skills, work product, financial independence, happiness, mental health, physical health, financial health, and the like. In some cases, base categorization 148 may include any categorization associated with system data 120 as described above. In some cases, elements of system data 120 may be categorized into one or more base categorizations 148. In some cases, processor 108 may receive system data 120 in the form of a spreadsheet or data structure wherein elements of system data 120 have already been categorized based on base categorization 148. In some cases, elements of system data 120 may be categorized using a classifier. In some cases, elements of system data 120 may be classified to one or more base categorization 148 using a base classifier 152, wherein each base categorization 148 may be associated with a particular base standard 144. In some cases, one or more elements of system data 120 may further be assigned a quantitative element as a function of the classification.

With continued reference to FIG. 1, A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifiers as described throughout this disclosure may be configured to output at least a datum that labels or otherwise identifies a set of data that are clustered together, found to be close under a distance metric as described below, or the like. In some cases, processor 108 may generate and train a base classifier 152 configured to receive system data 120 and output one or more base categorizations 148. Processor 108 and/or another device may generate a classifier using a classification algorithm, defined as a process whereby a computing device 104 derives a classifier from training data. In some cases base classifier 152 may use data to assign one or more quantitative elements to one or more elements within system data 120. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A base classifier 152 may be trained with training data correlating elements of system data 120 to base categorization 148 and/or numerical elements. In an embodiment, training data may be used to show that a particular element within system data 120 may be correlated to a particular base categorization 148 and a particular quantitative element. Training data may be received from an external computing device 104, user input, and/or previous iterations of processing. A base classifier 152 may be configured to receive as input and categorize components of system data 120 to one or more base categorizations 148. In some cases, processor 108 and/or computing device 104 may then select any elements system data 120 containing a similar label and/or grouping and group them together. In some cases, system data 120 may be classified using a classifier machine learning model. In some cases classifier machine learning model may be trained using training data correlating a plurality of system data 120 and/or data profiles 124 to a plurality of base categorizations 148. In an embodiment, a particular element within system data 120 may be correlated to a particular base categorization 148. In some cases, classifying system data 120 may include classifying system data 120 as a function of the classifier machine learning model. In some cases classifier training data may be generated through user input. In some cases, classifier machine learning model may be trained through user feedback wherein a user may indicate whether a particular element corresponds to a particular class. In some cases, classifier machine learning model may be trained using inputs and outputs based on previous iterations. In some cases, a user may input previous system data 120 and corresponding base categorizations 148 wherein classifier machine learning model may be trained based on the input.

With continued reference to FIG. 1, computing device 104 and/or processor 108 may be configured to generate classifiers as described throughout this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process for the purposes of this disclosure. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors for the purposes of this disclosure, may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, processor 108 may 'lookup' one or more elements within system data 120 on a lookup table to retrieve associated quantitative elements. A "lookup table," for the purposes of this disclosure, is a data structure, such as without limitation an array of data, that maps input values to output values. A lookup table may be used to replace a runtime computation with an indexing operation or the like, such as an array indexing operation. A look-up table may be configured to pre-calculate and store data in static program storage, calculated as part of a program's initialization phase or even stored in hardware in application-specific platforms. Data within the lookup table may include elements of system data 120 associated with one or more quantitative values. Data within the lookup table may be received from database. In some cases, processor 108 may determine the presence of a particular element within the lookup table and retrieve an associated quantitative element. In some cases, the lookup table may contain only those elements that are indicative when comparing system data 120 to a base standard 144. For example, an individual's name may not be present on a lookup table as the name may not be indicative of a change when comparing system data 120 to a base standard 144.

With continued reference to FIG. 1, processor 108 may be configured to calculate a sum or an average of the quantitative elements. In some cases, processor 108 may be configured to calculate a sum or an average of each grouping of elements labeled with a similar base categorization 148. In some cases, each base categorization 148 grouping may be compared to a base standard 144. In some cases, elements within data profile 124 may be compared to base standard 144.

With continued reference to FIG. 1, generating base categorization 148 may include determining base categorization 148 as a function of system data 120. In some cases, generating base categorization 148 may include calculating a sum of each data profile 124 associated with a particular base categorization 148 and calculating an average of the one or more data profiles 124. For example, base categorization 148 may include an average quantitative score of all individuals associated with one or more data profiles 124. In an embodiment, base standard 144 may be used to determine an average of each individual's capabilities and compare each individual to the generated average. In some cases, each data profile 124 may be compared to base categorization 148 wherein base categorization 148 is the average of the one or more data profiles 124. In some cases, base categorization 148 may include a calculation of one or more data profiles 124 wherein data profiles 124 with a particular standard deviation may be removed from the calculation. In some cases, base standard 144 may further include a range of one or more data profiles 124 wherein the range may include an average and a predetermined standard deviation from the average. For example, a particular base standard 144 may include an average of 5 and a standard deviation of 1 wherein the range may include a range of 4-6.

With continued reference to FIG. 1, base standard 144 may be calculated using a web crawler 140. The web crawler 140 may be configured to retrieve a plurality of data profiles 124 from one or more websites, such as social media websites, job sites and the like, wherein processor 108 may determine a base deviation 164 based on the data profiles 124 retrieved using the web crawler 140. In some cases, web crawler 140 may be configured to retrieve a plurality of data profiles 124 associated with a particular profession, a particular field, a particular employment position and the like. In an embodiment, processor 108 may generate one or more base standards 144 based in a particular profession, a particular field, a particular employment position and the like. In an embodiment, an individual with a particular employment position may be compared to a differing base standard 144 than an individual with another employment position.

With continued reference to FIG. 1, processor 108 is configured to generate one or more outliers 156 from the system data 120 as a function of the one or more base standards 144. An "outlier" for the purposes of this disclosure, is an element or a categorization of elements that does not fall within a range of an associated base standard 144 or fall short in comparison to base standard 144. For example, an element with an associated quantitative element of 4 may be an outlier 156 when the associated base standard 144 is 6 or a range of 6-8. In another nonlimiting example, a particular base categorization 148 grouping may not be considered an outlier 156 when the base categorization 148 grouping contains an associated quantitative element of 5 or an average of 5 and the base standard 144 includes a numerical element of 4 or a range of 4-6. In some cases, a range associated with base standard that may be used to determine one or more outliers 156 may include ranges determined within a particular standard deviation (e.g. 1 standard deviation away). In some cases, a range associated with base standard may further include percentages of base standard 144. For example, outlier 156 may include any elements that fall outside a particular range, such as 10% of base standard 144 or 20% of base standard 144. In some cases, ranges may be determined using percentages of base standard, standard deviations, particular numerical deviations (e.g. +/−5), multiplier deviations, and the like. In some cases, outlier 156 may include one or more elements within system data 120. In some cases, outliers 156 may include base categorization 148 groupings wherein an outlier 156 may indicate that an individual is deficient in a particular area such as communicative skills or work product. In some cases one or more outliers 156 may be used to indicate an individual's performance, an individual's experience at a particular entity, an individual's engagement level at the particular entity, the individual's work product at the entity and the like. In some cases outliers 156 may be used to determine where an individual is lacking. In some cases, outliers 156 may be used to determine how an individual is performing in comparison to other individuals. In some cases, outliers 156 may be used to determine how an individual is performing in comparison to individuals within a similar field, a similar, profession and the like. In some cases, outliers 156 may be used to determine what areas an individual may need some guidance on. For example, an outlier 156 may indicate that an individual's physical health or work-life balance is low wherein the individual may be able to receive guidance on improving their work life balance.

With continued reference to FIG. 1, processor 108 may select one or more outliers 156 by sorting the system data 120 into one or more base categorizations 148 as described above. In some cases, sorting may include classifying system data 120 to one or more base categorizations 148. Processor 108 may then compare the base categorizations 148 and/or the base categorization 148 groupings to one or more base standards 144 as described above. Processor 108 may then select one or more outliers 156 as a function of the comparison. In some cases, the outliers 156 may include groupings of data, the base categorization 148 label, and/or elements of system data 120.

With continued reference to FIG. 1, base standard 144 may further include ranges or numerical elements that are calculated based on an individual's own system data 120. For example, base standard 144 may be used to indicate if an individual achieved a particular goal the individual set for themselves as indicated in milestone datum 136. For example, an individual may indicate that they plan to have a better work like balance by a particular year wherein base standard 144 may be used to determine if the individual's goa was achieved by the particular year. In some cases, base standard 144 may include numerical elements that are associated with dates, such as days months or years, wherein the base standard 144 is calculated based on the individual's goal as indicated in milestone datum 136 and a comparison to whether the user achieved the goal. For example, base standard 144 may include a date of 06/17 which correlated to June 17th wherein an element within system data 120 may be compared to June 17 to determine if the user achieved their goal by a particular date. In some cases, base standard 144 may include one or more dates wherein the dates may be used to determine if the individual achieved a goal, a product or any other service or activity within a given particular time frame. In some cases, base standard 144 may include the number of hours, days or years it may take a user to accomplish a particular goal and elements of system data 120 correlating to said goal may be compared to base standard 144. In some cases, base standard 144 may include a predetermined amount of time it may take to finish a task. In some cases, base standard 144 may be calculated based on averages within the entity or averages within a particular field as described above. In some cases, an individual's activities may be compared to base standard 144 to determine if the individual is efficient in their work or activities.

With continued reference to FIG. 1, processor 108 is configured to generate one or more outlier modules 160 for each data profile 124 as a function of the selection. In some cases, processor 108 is configured to generate one or more outlier modules 160 as a function of one or more outliers 156. "Outlier module" for the purposes of this disclosure, is interrelated information associated with the one or more selected outliers 156. The interrelated information may include instructions on improving an outlier, interactive elements, videos, and the like. In some cases, each outlier module 160 may include the selected outlier 156, the quantitative element associated with the outlier 156, a base deviation 164, and the like. "Base deviation" for the purposes of this disclosure, is an amount in which the outlier 156 deviates from the base standard 144. For example, an outlier 156 with an associated quantitative element of 5 may contain a base deviation 164 of 4 when the base standard 144 is 9. In some cases, base deviation 164 may be represented in a numerical element, a percentile, a standard deviation and the like. In some cases, base deviation 164 may be used to determine the severity of the outlier 156. For example, an individual with a small base deviation 164 may differ from an individual with a large deviation. Continuing, an individual with a small base deviation 164 in communicative skills may minimal guidance to hit minimize the deviation whereas an individual with a large base deviation 164 may include more guidance on minimizing their base deviation 164.

With continued reference to FIG. 1, outlier module 160 may further include instructions and/or steps on how an individual may be able to minimize their base deviation 164. In some cases, outlier module 160 may include instructions or steps on how a person associated with the individual (e.g. a manager) may be able to help the individual minimize their base deviation 164. In some cases, outlier module 160 may include steps on how to minimize a particular deviation. For example, outlier module 160 may include steps on how an individual can improve their communicative skills, improve their collaboration skills, improve their work product and the like. Similarly, outlier module 160 may include steps or instruction on how an individual may improve their mental health, physical health and the like. In some cases, outlier module 160 may include instructions or steps on how an individual may be able to achieve goals in one or more milestone categories. In some cases, outlier module 160 may include pre-recorded videos, wherein each video may correspond to a particular outlier 156. In some cases, the recorded videos may be retrieved from a database. In some cases, outlier module 160 may include instructions for a manager on how to minimize the individua's base deviation 164. This may include instructions such as giving the individual a mental health day, assigning work that the individual is proficient at, giving the individual a bonus, engaging the individual in more social activities and the like. In some cases, one or more elements of outlier module 160 may be received from a database. In some cases, each outlier module 160 may be associated with a particular base categorization 148 wherein selection of a base categorization 148 as an outlier 156 may indicate to processor 108 to retrieve a particular outlier module 160. In some cases, database may be populated with a plurality of outlier modules 160 or elements thereof wherein processor 108 may be configured to select an outlier module 160 that is correlated to the selected outliers 156. In some cases, processor 108 may use a lookup table to lookup associated outlier modules 160 with each base categorization 148. In some cases each base categorization 148 may be associated with more than one outlier modules 160 wherein each outlier module 160 may be correlated to a particular base deviation 164 or a range of base deviations 164. In some cases, each outlier module may be populated by a user, such as a manager, an operator of apparatus 100, and entity and the like. In some cases, each outlier module may be populated and uploaded to database 116. In some cases, processor may be configured to retrieve the pre-populated outlier modules. In some cases, outlier 156 and/or base deviation 164 may contain a correlated instruction set wherein, the correlated instruction set is populated and/or created by a user. In some cases, each correlated instruction set may be retrieved by processor and used as a portion of outlier module 160. In some cases, processor 108 may use a lookup table to find the corelated instruction set associated with a particular outlier 156 and/or base deviation 164. For example, an individual with a smaller base deviation 164 in relation to a base categorization 148 of communicative skills may be given an outlier module 160 that provides differing guidance than an individual with a larger base deviation 164. In some cases, each outlier module 160 may be associated with a particular range of base deviations 164, such as for example, 1-5, 5-10, 10-15, and the like. In some cases, a particular base categorization 148 and a corresponding base deviation 164 may be used to lookup and/or retrieve a particular outlier module 160.

With continued reference to FIG. 1, previous member data 128 as described above may further include outliers 156 created on previous iterations of the processing. For example, previous member data 128 may include a data profile 124 generated on a different day, month year and the like. In some cases, outlier module 160 may include an improvement score generated as a function of the one or more outliers 156 and the previous member data 128. "Improvement datum" for the purposes of this disclosure, is information associated with a change in score of a particular outlier 156 selected on the current iteration compared to the same or similar outlier 156 selected on a previous iteration. For example, improvement datum may contain a change in the quantitative elements associated with an outlier 156 on a first iteration in comparison to the selected outlier 156 in a second iteration (or alternatively, the current iteration). Continuing, improvement datum may be used to indicate that a user's base deviation 164 on an outlier 156 improved in comparison to a previous processing of system data 120. Additionally or alternatively, improvement datum may indicate that an individual's base deviation 164 increased since the previous iteration. This may indicate that the outlier modules 160 may have not been effective on the individual. In some cases, processor 108 may modify system data 120 at the conclusion of the processing wherein processor 108 may update previous member data 128 with one or more selected outliers 156. In some cases, system data 120 may be stored on a database wherein processor 108 may receive elements of system data 120 and retrieve one or more selected outliers 156 for use as previous member data 128. In some cases, previous member data 128 may include outliers 156 selected from more than one iteration wherein the outliers 156 may be used to determine an individual's improvement over a given period of time. In some cases, previous member data 128 may be used to determine if a generated outlier module 160 was effective. In some cases, processor 108 may receive previously selected outlier modules 160 and determine whether a previous outlier module 160 was effective based on improvement datum. In some cases, processor 108 may be configured not to generate a similar outlier module 160 if improvement datum indicates that the previously used outlier modules 160 as not effective. In some cases, previous member data 128 may be used to track an individual's improvements or outliers 156 over a given period. In some cases, previous member data 128 may be used to determine if previously selected outlier modules 160 were effective and if so, how effective they were. For example, a particular outlier module 160, while still effective, may have only minimized the base deviation 164 by a small amount whereas another outlier module 160 may have minimized the base deviation 164 by a large amount.

With continued reference to FIG. 1, In some cases, one or more outlier modules 160 may be created and/or generated by an individual associated with the entity such as a manager of the entity, a professional, and the like. In some cases, one or more outlier modules 160 may be generated using a web crawler 140. In some cases, an individual associated with the entity may continuously update/modify a database and provide outlier modules 160 that have worked in the past or may seem to work in the future. In some cases, an individual may populate database with techniques and/or instructions that have been proven to work on previous occasions and with other individuals.

With continued reference to FIG. 1, generating outlier modules 160 may include generating outlier module 160 as a function on an outlier machine learning model 168. Processor 108 may use a machine learning module, such as an outlier 156 machine learning module for the purposes of this disclosure, to implement one or more algorithms or generate one or more machine-learning models, such as an outlier machine learning model 168, to generate one or more outlier modules 160. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database, such as any database described in this disclosure, or be provided by a user. In other embodiments, a machine-learning module may obtain a training set by querying a communicatively connected database that includes past inputs and outputs. Training data may include inputs from various types of databases, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more base categorization 148 corresponding to categories of data elements. As a non-limiting example, training data may include data entered in standardized forms by persons or processes, such that entry of a given data element in a given field in a form may be mapped to one or more categories. Elements in training data may be linked to categories by tags, tokens, or other data elements. A machine learning module, such as outlier 156 machine learning module, may be used to generate outlier machine learning model 168 and/or any other machine learning model described herein using training data. Outlier machine learning model 168 may be trained by correlated inputs and outputs of training data. Training data may be data sets that have already been converted from raw data whether manually, by machine, or any other method. Outlier training data 172 may be stored in database. Outlier training data 172 may also be retrieved from database. In some cases, outlier machine learning model 168 may allow for computing device 104 to compare two data items, to sort efficiently, and/or to improve the accuracy of analytical methods.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database, such as any database described in this disclosure, or be provided by a user such as a prospective employee, and/or an employer and the like. In other embodiments, outlier 156 machine-learning module may obtain a training set by querying a communicatively connected database that includes past inputs and outputs. Training data may include inputs from various types of databases, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more base categorizations 148 corresponding to categories of data elements. As a non-limiting example, training data may include data entered in standardized forms by persons or processes, such that entry of a given data element in a given field in a form may be mapped to one or more of categories. Elements in training data may be linked to categories by tags, tokens, or other data elements.

With continued reference to FIG. 1 generating one or more outlier modules 160 may include receiving outlier training data 172 including a plurality of outlier 156 correlated to a plurality of outlier modules 160. In some cases, outlier training data 172 may include a plurality of outliers 156 and/or a plurality of data profiles 124 correlated to a plurality of outlier modules 160. In an embodiment, outlier training data 172 may be used to indicate a particular outlier module 160. In another embodiment, outlier training data 172 may indicate a particular outlier module 160 for a given outlier 156 and the correlated data profile 124. For example, outlier training data 172 may indicate a particular outlier module 160 that takes into account the individual's previous outliers 156 selected in a previous iteration. In some cases, outlier training data 172 may be received from a user, third party, database, external computing devices 104 previous iterations of the processing and/or the like as described in this disclosure. In some cases, cases outlier training data 172 may include previous iterations of system data 120 and previous iterations of outlier modules 160. In some cases, outlier training data 172 may include previous member data 128 wherein previous member data 128 comprises one or more outliers 156 and correlated outlier modules 160 from a previous processing. In some cases, previous member data 128 may be used to train outlier machine learning model 168 wherein improvement datum may indicate if a particular outlier module 160 was effective. For example, processor 108 may determine that the individual's base deviation 164 increased on a second iteration thereby indicating that a particular outlier module 160 was not effective. In some cases, generating one or more outlier modules 160 further includes training outlier machine learning model 168 as a function of the outlier training data 172 and generating one or more outlier modules 160 as a function of the outlier machine learning model 168. In some cases, outlier training data 172 may be trained based on user input wherein user input may determine if a particular training data was accurate as a result of a previous iteration.

With continued reference to FIG. 1, processor 108 may be configured to modify system data 120 as a function of one or more outliers 156. In some cases, processor 108 may be configured to modify system data 120 as a function of one or more outlier modules 160. In some cases, system data 120 may be modified to include one or more outliers 156, one or more outliers 156' modules and the like. In some cases, system data 120 may be transmitted to a database. In some cases, system data 120 may be fragmented into data profiles 124 wherein each data profile 124 may be transmitted to a database and retrieved in a future processing as previous member data 128. In some cases, each data profile 124 may be modified to include one or more outliers 156 and correlated outlier modules 160 wherein processor 108 may retrieve data profile 124 from a database in the future as previous member data 128 and used for processing. In some cases, database may include previous member data 128 wherein processor 108 may be configured input data profile 124 into previous member data 128.

With continued reference to FIG. 1, processor 108 is further configured to modify a graphical user interface 176 as a function of the one or more outlier modules 160. In some cases, processor 108 may be configured to create a user interface data structure. As used in this disclosure, "user interface data structure" is a data structure representing a specialized formatting of data on a computer configured such that the information can be effectively presented for a user interface. User interface data structure may include one or more outliers 156, one or more outlier modules 160 and any other data described in this disclosure.

With continued reference to FIG. 1, processor 108 may be configured to transmit the user interface data structure to the graphical user interface 176. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database wherein the data may be accessed from database. Processor 108 may further transmit the data above to a device display or another computing device 104.

With continued reference to FIG. 1, apparatus includes a graphical user interface 176 (GUI 176). For the purposes of this disclosure, a "user interface" is a means by which a user and a computer system interact. For example, through the use of input devices and software. In some cases, processor 108 may be configured to modify graphical user interface 176 as a function of the one or more outlier modules 160 by populating user interface data structure with one or more outlier modules 160 and visually presenting the one or more outlier modules 160 through modification of the graphical user interface 176. A user interface may include graphical user interface 176, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface 176," as used herein, is a user interface that allows users to interact with electronic devices through visual representations. In some embodiments, GUI 176 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface 176. Persons skilled in the art, upon reviewing the entirety of this disclosure, will be aware of various ways in which a graphical user interface 176 and/or elements thereof may be implemented and/or used as described in this disclosure.

With continued reference to FIG. 1, apparatus may further include a display device communicatively connected to at least a processor 108. "Display device" for the purposes of this disclosure, is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through the GUI 176 to a user, wherein a user may interact with the data through GUI 176. In some cases, a user may view GUI 176 through display.

With continued reference to FIG. 1, GUI 176 may be configured to visually present one or more outlier modules 160 to a user. In some cases, GUI 176 may visually present one or more elements of an outlier module 160. In some cases, GUI 176 may visually present outlier modules 160 as clickable graphical elements wherein each graphical element is associated with a particular base categorization 148. In some cases, each outlier module 160 may include visual representations of base deviations 164, improvement datum and the like. The visual representation may include graphs depicting a change over time, pie charts and the like.

Figure 2:
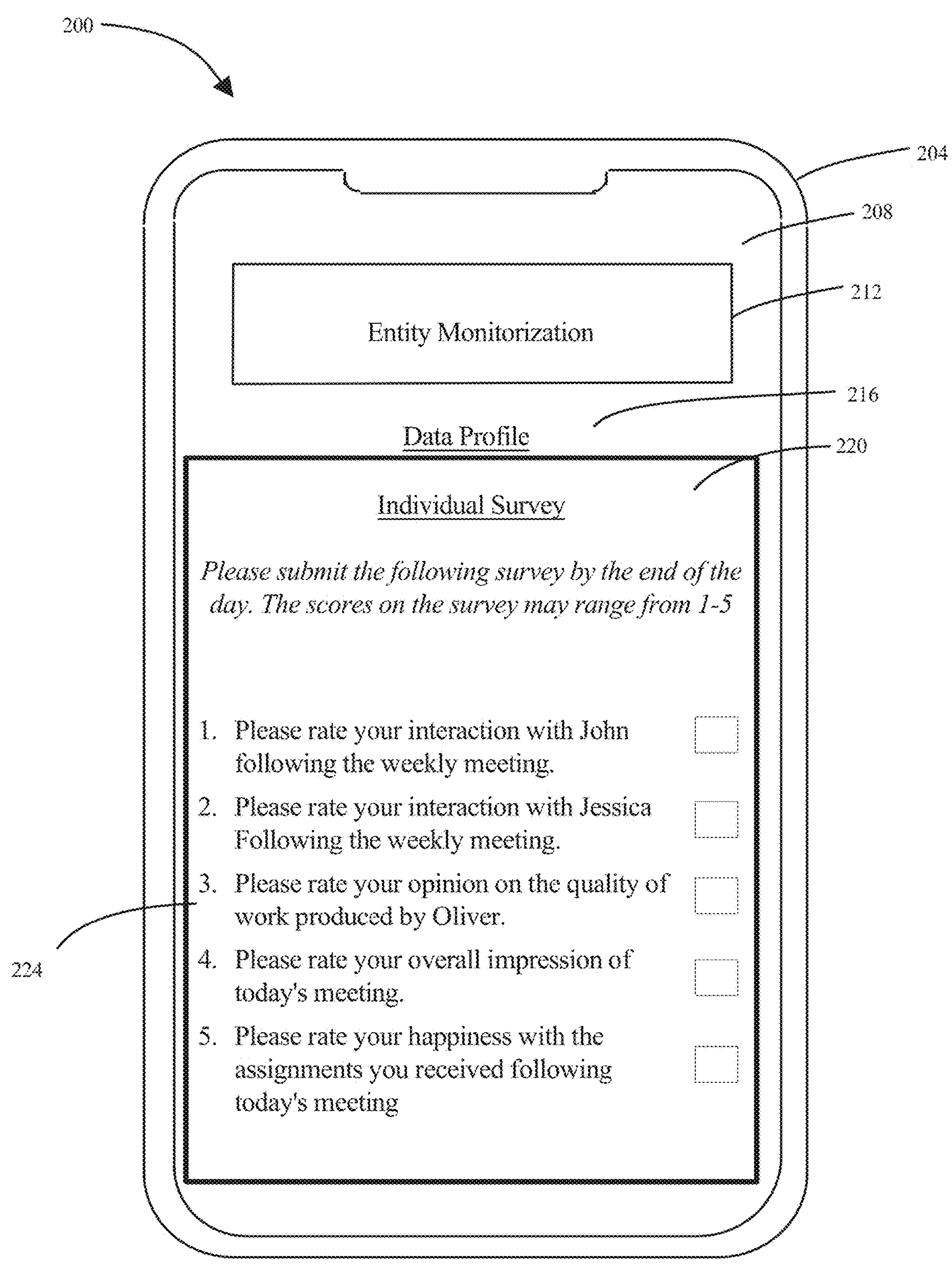
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purposes of this disclosure, is the information that is capable of being displayed within a border of device display. A user may navigate through different windows 208 wherein each window 208 may contain new or differing information or data. For example, a first window 208 may display information relating to system data, whereas a second window may display information relating to the outlier modules as described in this disclosure. A user may navigate through a first second, third and fourth window (and so on) by interacting with GUI 200. For example, a user may select a button or a box signifying a next window on GUI 200, wherein the pressing of the button may navigate a user to another window. In some cases, GUI 200 may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows 208 wherein each window 208 may request or display information to or from a user. In this instance, window 208 displays an identification field 212 wherein the identification field signifies to a user, the particular action/computing that will be performed by a computing device. In this instance identification field 212 contains information stating "Entity Oversight" wherein a user may be put on notice that any information being received or displayed will be used to monitor individuals within an entity. This may be done through the receipt of system data and the generation of one or more outlier modules as described in this disclosure. Identification field 212 may be consistent throughout multiple windows 208. Additionally, in this instance, window 208 may display a sub identification field 216 wherein the sub identification field may indicate to a user the type of data that is being displayed or the type of data that is being received. In this instance, sub identification field 216 contains "Data profile". This may indicate to a user that computing device is currently collecting information relating to one or more data profiles. Additionally, window 208 may contain a prompt 220 indicating the data that is being described in sub identification field 216 wherein prompt 220 is configured to display to a user the data that is currently being received and/or generated. In this instance, prompt 220 notifies a user that a survey is currently present in the current window 208. In this instance GUI may contain survey questions 224 along with input boxes wherein input into the input boxes may indicate to computing device the receipt of information. In this instance, system data may be received through one or more surveys conducted by one or more individuals. In some cases, each individual within an entity may be tasked with filling out a survey or answering questions, wherein processor may receive the answers to the questions as system data.

With continued reference to FIG. 2, GUI 200 may be configured to receive user feedback. For example, GUI may be configured to generate one or more outlier modules wherein a user may interact with GUI 200 and provide feedback on the generated outlier modules. In some cases, a user may desire to view multiple outlier modules wherein a user may navigate back and forth through various windows to select one or more outlier modules and view any corresponding information associated with the outlier modules. In some cases, user feedback may be used to train a machine learning model as described above. In some cases, user feedback may be used to indicate computing device to generate alternative outlier modules.

Figure 3:
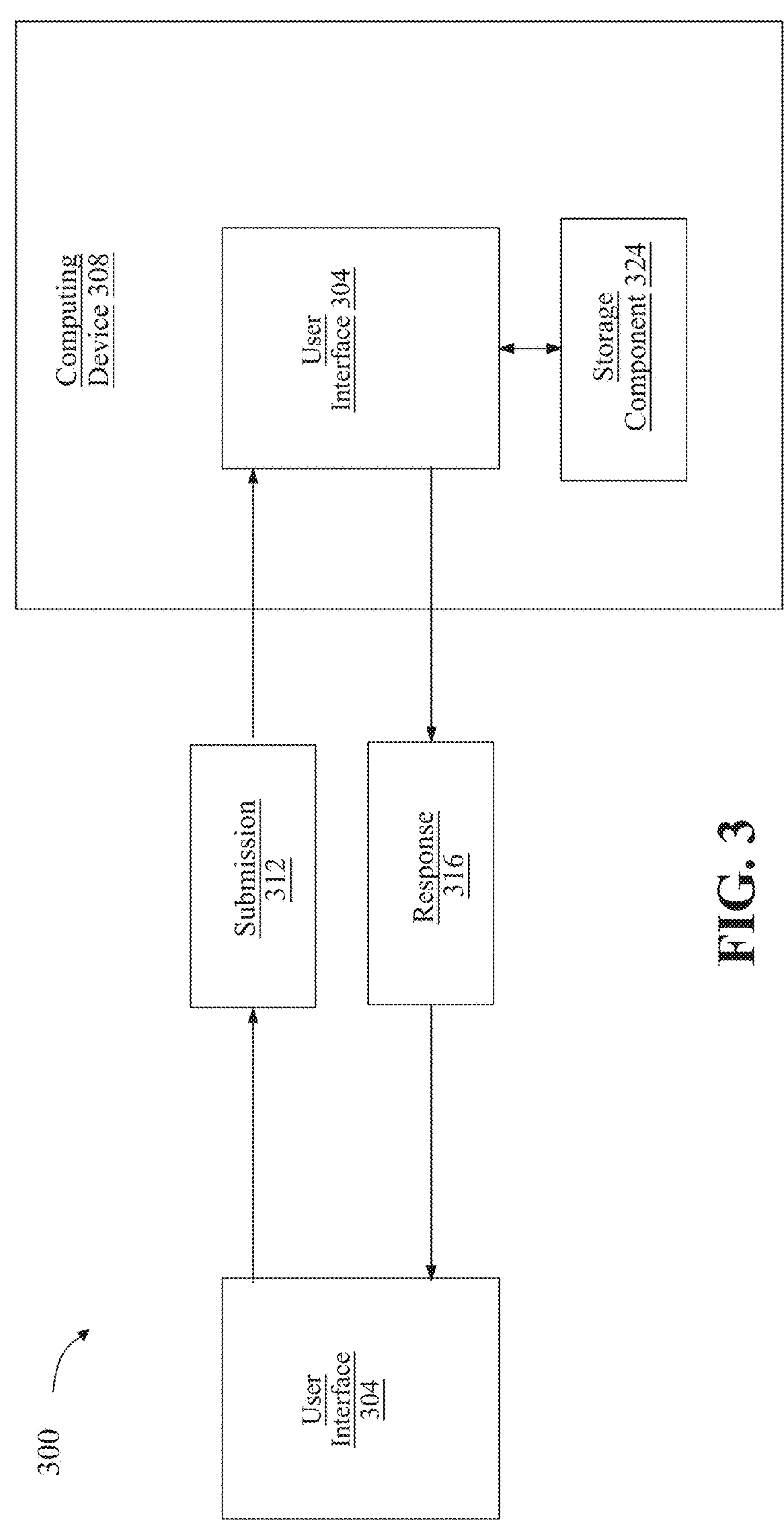
FIG. 3 is a block diagram of exemplary embodiment of a chatbot.

Referring to FIG. 3, a chatbot system 300 is schematically illustrated. According to some embodiments, a user interface 304 may be communicative with a computing device 308 that is configured to operate a chatbot. In some cases, user interface 304 may be local to computing device 308. Alternatively or additionally, in some cases, user interface 304 may remote to computing device 308 and communicative with the computing device 308, by way of one or more networks, such as without limitation the internet. Alternatively or additionally, user interface 304 may communicate with computing device 308 using telephonic devices and networks, such as without limitation fax machines, short message service (SMS), or multimedia message service (MMS). Commonly, user interface 304 communicates with computing device 308 using text-based communication, for example without limitation using a character encoding protocol, such as American Standard for Information Interchange (ASCII). Typically, a user interface 304 conversationally interfaces a chatbot, by way of at least a submission 312, from the user interface 304 to the chatbot, and a response 316, from the chatbot to the user interface 304. In many cases, one or both of submission 312 and response 316 are text-based communication. Alternatively or additionally, in some cases, one or both of submission 312 and response 316 are audio-based communication.

Continuing in reference to FIG. 3, a submission 312 once received by computing device 308 operating a chatbot, may be processed by a processor 320. In some embodiments, processor 320 processes a submission 312 using one or more of keyword recognition, pattern matching, and natural language processing. In some embodiments, processor employs real-time learning with evolutionary algorithms. In some cases, processor 320 may retrieve a pre-prepared response from at least a storage component 324, based upon submission 312. Alternatively or additionally, in some embodiments, processor 320 communicates a response 316 without first receiving a submission 312, thereby initiating conversation. In some cases, processor 320 communicates an inquiry to user interface 304; and the processor is configured to process an answer to the inquiry in a following submission 312 from the user interface 304. In some cases, an answer to an inquiry present within a submission 312 from user interface 304 may be used by computing device 104 as an input to another function, such as any data described above.

Figure 4:
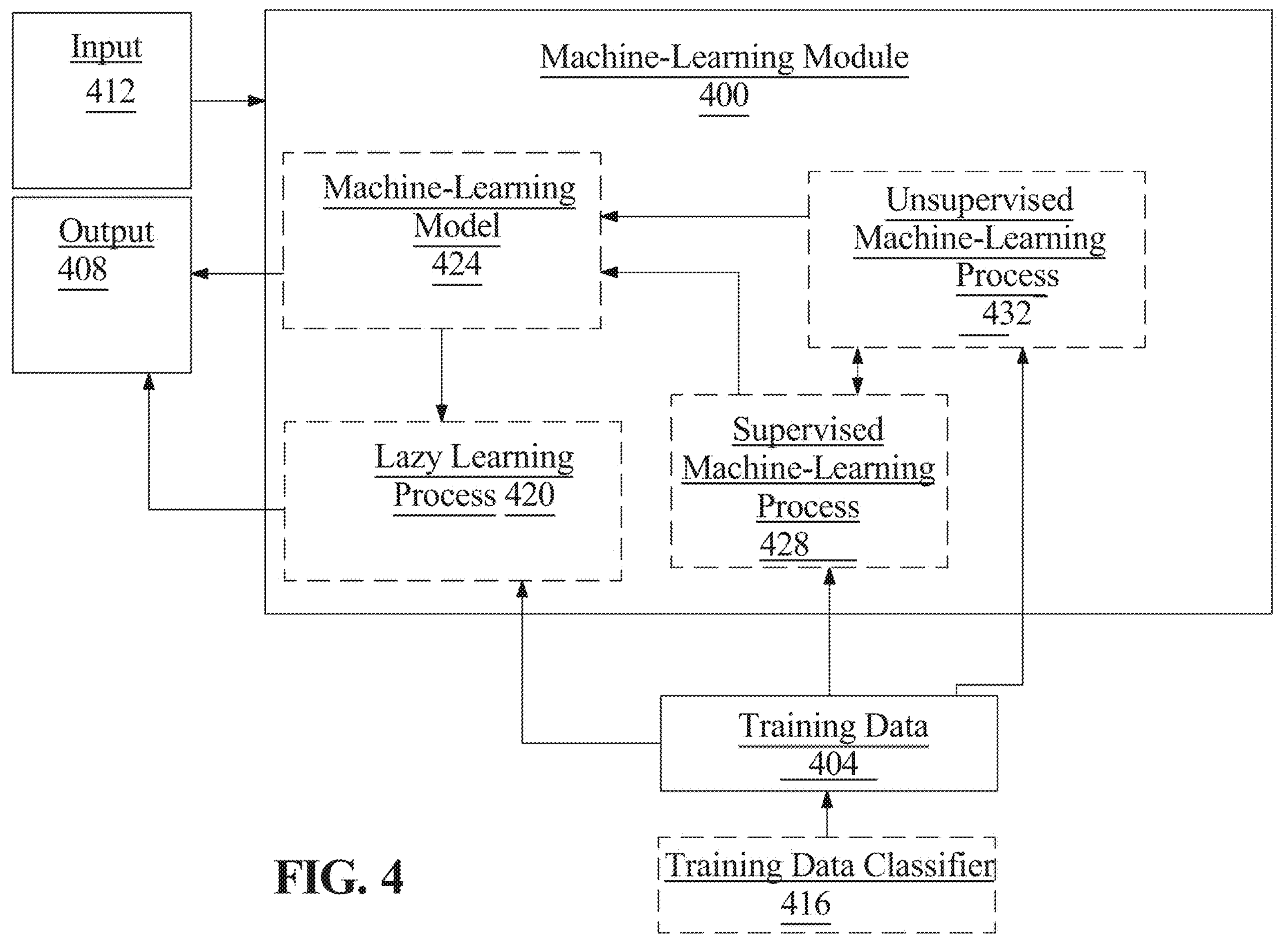
FIG. 4 is a block diagram of exemplary embodiment of a machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative inputs, such as for example outliers, and outputs as described in this disclosure as outputs, such as for example, outlier modules, Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to one or more base categorizations as described above, wherein outputs may be generated as a function of the base categorization. For example, inputs and outputs may be classified to a particular base categorization wherein correlated outputs containing a similar base categorization may be selected. In some cases, classification may allow for training of a machine learning model wherein classification may aid in pattern recognition. In some cases, classification may allow for pattern recognition wherein similarly classified inputs and outputs may indicate a particular pattern to train the machine learning model. In some cases, classification may allow for minimized error in machine learning wherein the machine learning model may be trained with classified data. In some cases, classification may allow for preconditioning of training data wherein elements of training data are improved prior to feeding the elements into the machine learning model. In some cases, preconditioning may include up sampling and down sampling. In some cases up sampling and down sampling may aid in balancing of classes. In some cases, preconditioning may include removing errors, removing inconsistencies, fixing errors and the like prior to feeding data into the machine learning model. In some cases, preconditioning may aid in class imbalances, wherein majority classes have over presentation may be selected over minority classes having under representation. In some cases, up sampling and down sampling may aid in class balancing.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs as described in this disclosure as inputs, such as for example outliers, outputs as described in this disclosure as outputs, such as for example, outlier modules, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
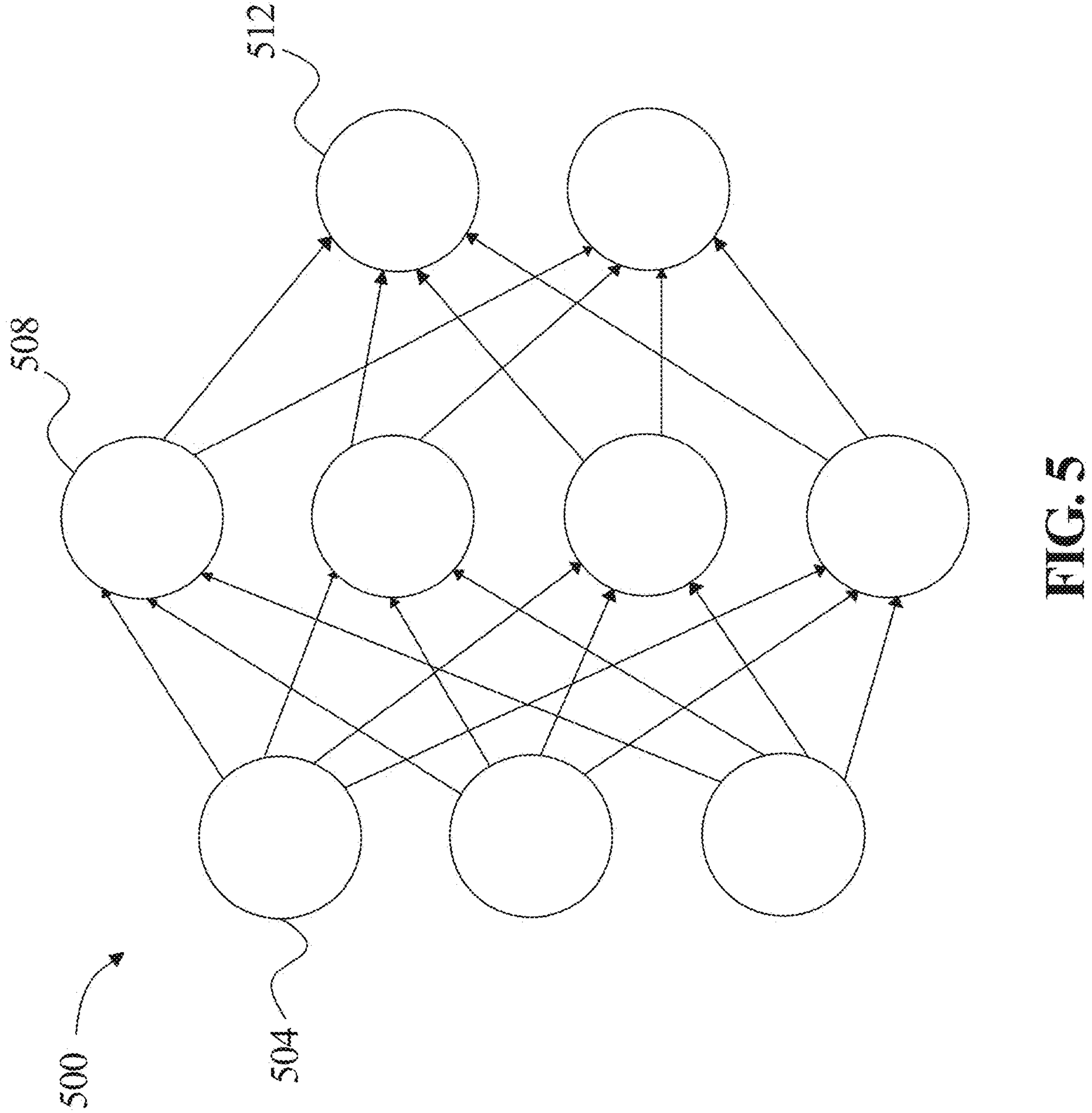
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
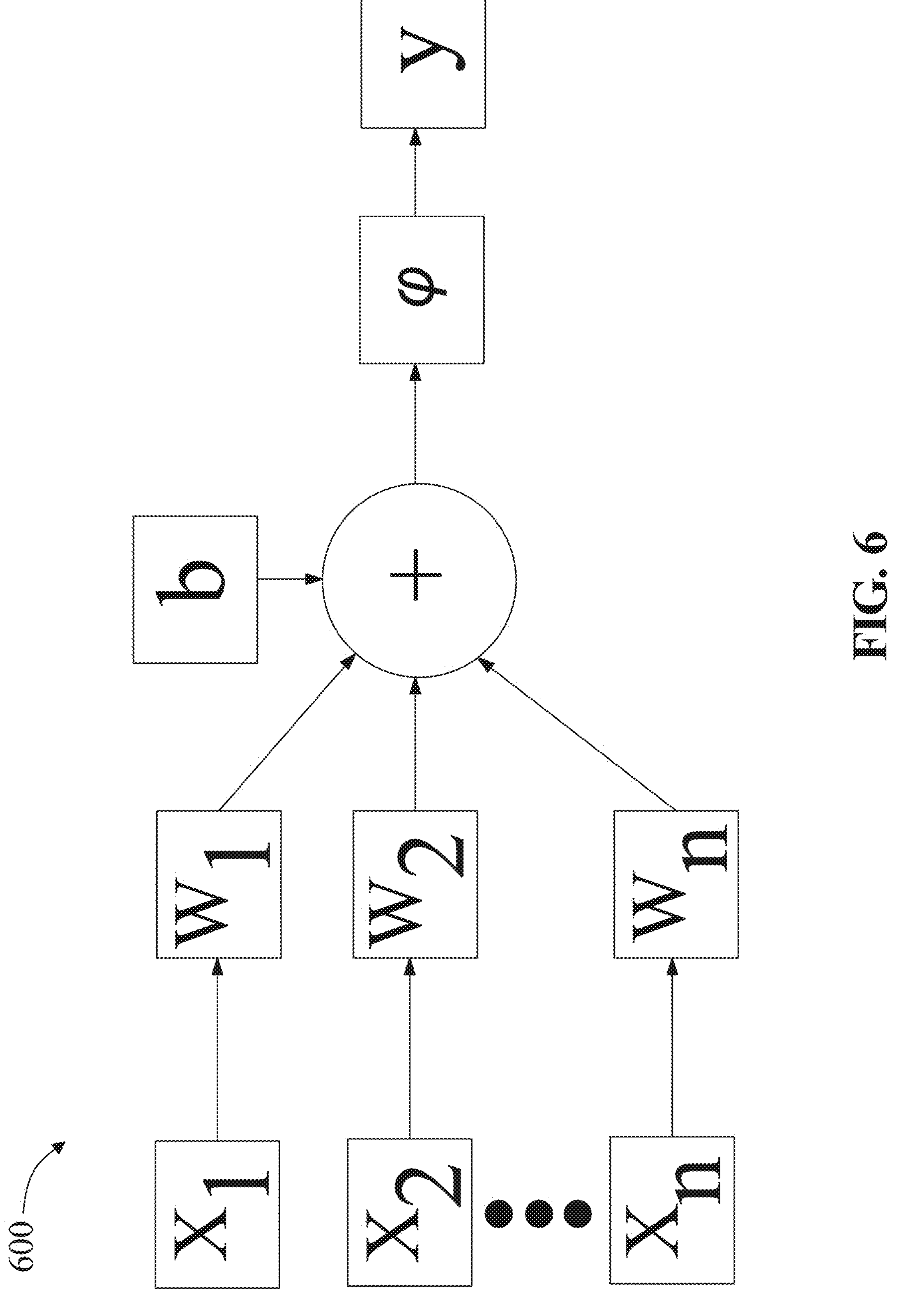
FIG. 6 is a block diagram of an exemplary embodiment of a node of a neural network.

Referring now to FIG. 6, an exemplary embodiment of a node 600 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
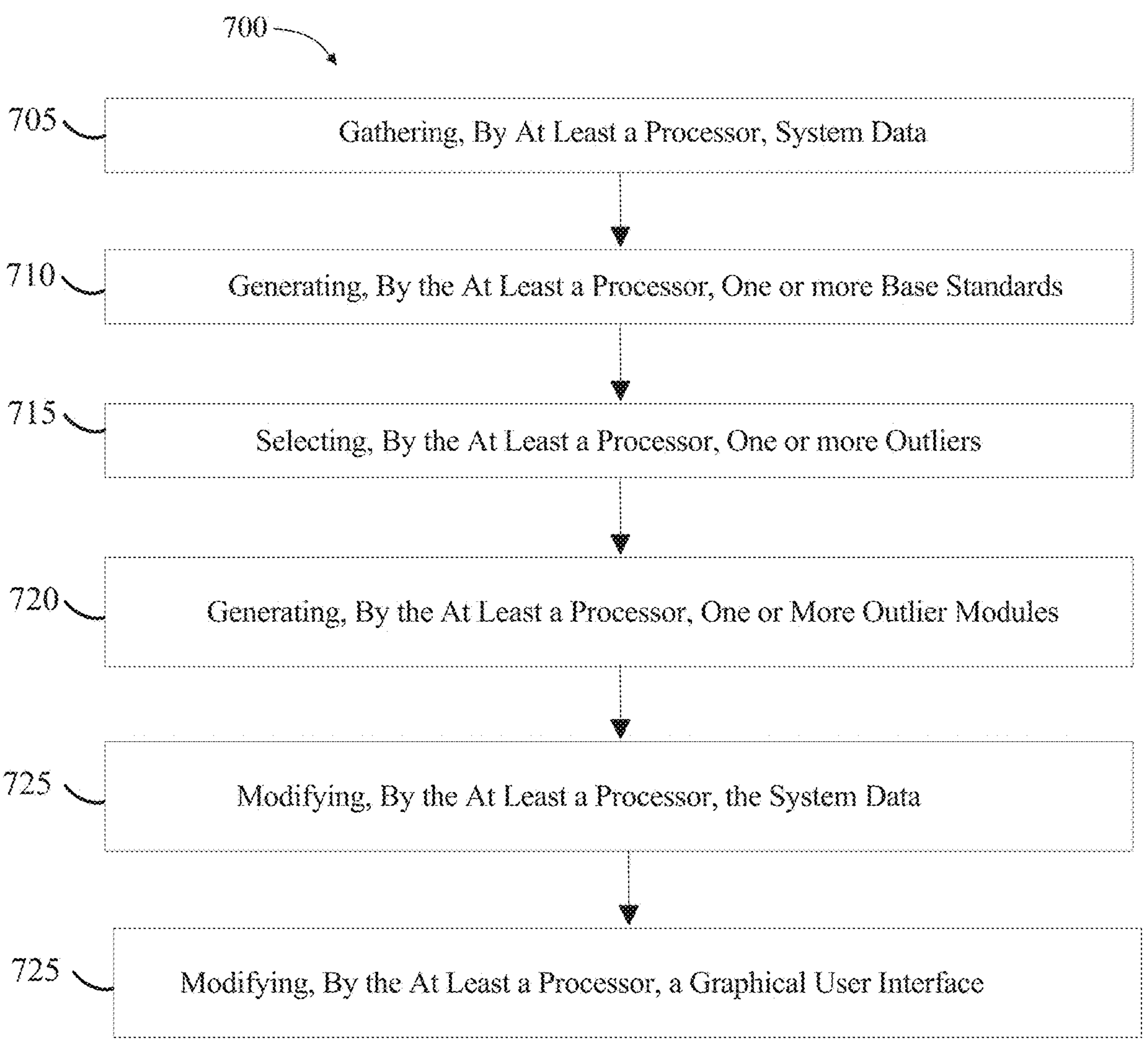
FIG. 7 is a flow diagram illustrating an exemplary embodiment of a method for entity oversight.

Referring now to FIG. 7, a method 700 for entity oversight is described. At step 705, method 700 incudes gathering, by at least a processor, system data, the system data having one or more data profiles, wherein each data profile incudes at least previous member data. In some cases, each data profile further includes condition datum. In some cases, each data profile further includes milestone datum. This may be implemented with reference to FIGS. 1-7 and without limitation.

With continued reference to FIG. 7, at step 710 method 700 includes generating, by the at least a processor, one or more base standards. In some cases, wherein generating, by the at least a processor, the one or more base standards includes generating the one or more base standards as a function of system data. In some cases, generating one or more base standards includes generating one or more base standards as a function of a web crawler. This may be implemented with reference to FIGS. 1-7 and without limitation.

With continued reference to FIG. 7, at step 715, method 700 includes selecting, by the at least a processor, one or more outliers from the system data as a function of the one or more base standards. In some cases, selecting, by the at least a processor, one or more outliers from the system data includes, sorting the system data into one or more base categorizations comparing each element within the one or more base categorizations to the one or more base standards and selecting one or more outliers as a function of the comparison. In some cases, sorting the system data into one or more base categorizations Includes classifying the system data to one or more base categorizations. This may be implemented with reference to FIGS. 1-7 and without limitation.

With continued reference to FIG. 7, at step 720 method 700 includes generating by the at least a processor, one or more outlier modules for each data profile as a function of the selection. In some cases, one or more outlier modules may include a base deviation. In some cases, generating, by the at least a processor, the one or more outlier modules for each data profile as a function of the selection includes receiving outlier training data having a plurality of outliers correlated to a plurality of outlier modules, training an outlier machine learning model as a function of the outlier training data and generating one or more outlier modules as a function of the one or more outliers. This may be implemented with reference to FIGS. 1-7 and without limitation.

With continued reference to FIG. 7, at step 720 method 700 includes modifying, by the at least a processor, the system data as a function of the one or more outliers. In some cases, modifying, by the at least a processor, the system data as a function of the one or more outliers includes fragmenting the system data into the one or more data profiles, modifying the one or more data profiles to include the one or more outliers and the one or more outlier modules, and transmitting one or more data profiles to a database. This may be implemented with reference to FIGS. 1-7 and without limitation.

With continued reference to FIG. 7, at step 725, method 700 includes modifying, by the at least a processor, a graphical user interface as a function of the one or more outlier modules. This may be implemented with reference to FIGS. 1-7 and without limitation.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
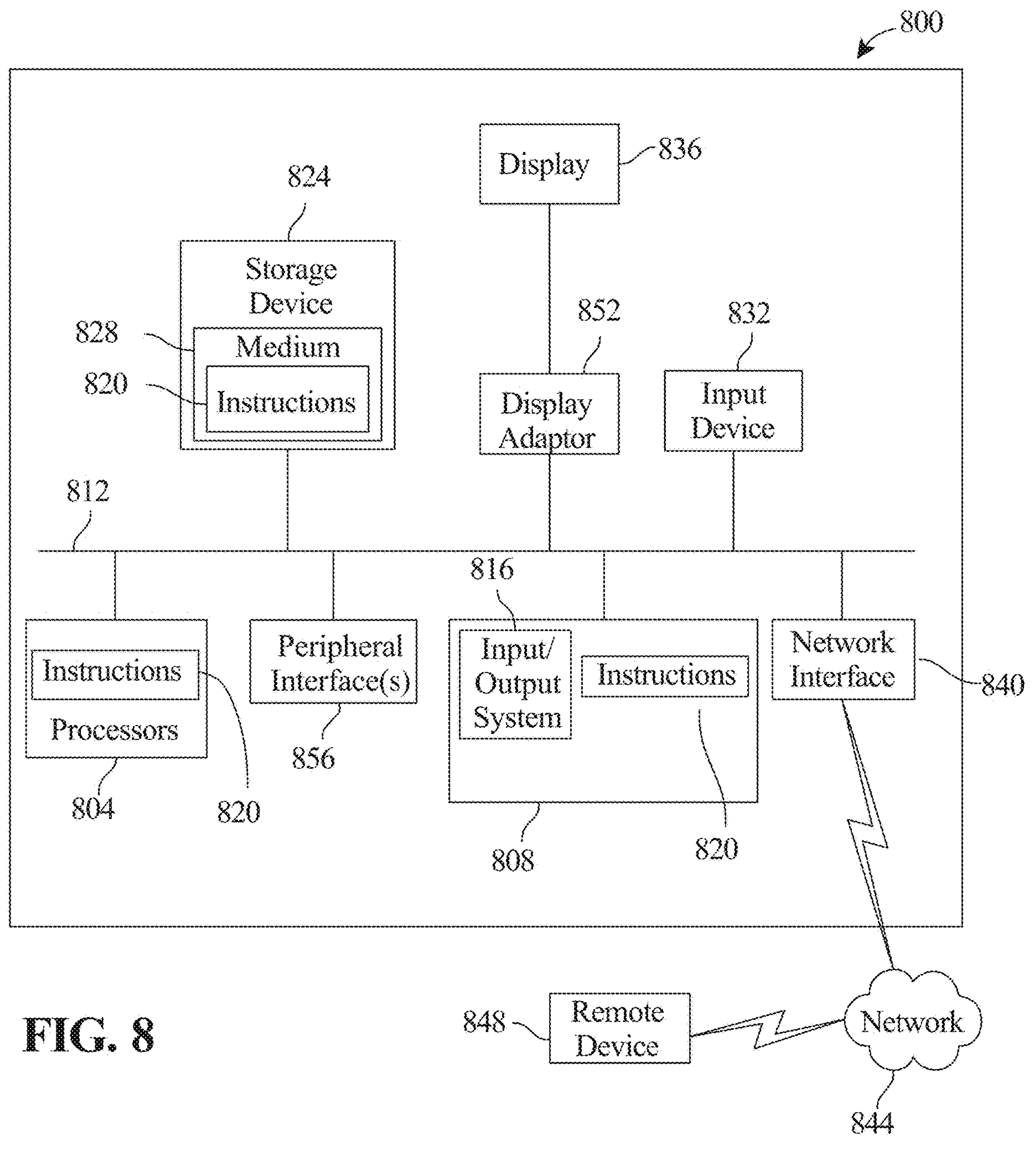
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display device 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for entity oversight, the apparatus comprising:

one or more wearable devices communicatively connected to at least a processor and configured to detect user-specific health data and represent as a physical health status;

at least a graphical user interface communicatively connected to the at least a processor; and a memory communicatively connected to the at least a processor, the memory containing instructions configuring the at least a processor to:

collect system data, wherein the system data comprises one or more data profiles, wherein each data profile of the one or more data profiles comprises at least previous member data, wherein the at least previous member data comprises previous iterations of the one or more data profiles;

generate one or more base standards, wherein data profiles within a predetermined threshold are removed before the one or more base standards are generated;

select one or more outliers from the system data as a function of the one or more base standards;

update the previous member data with the one or more selected outliers;

generate one or more outlier modules for each data profile of the one or more data profiles as a function of the selection, wherein generating the one or more outlier modules comprises:

receiving outlier training data correlating a plurality of outliers to a plurality of outlier modules, wherein the outlier training data comprises previous member data updated with the one or more selected outliers;

preconditioning the outlier training data to minimize error in an outlier machine learning model, wherein preconditioning comprises at least one of up sampling and down sampling to balance data classes;

training an outlier machine learning model as a function of the outlier training data; and generating one or more outlier modules as a function of the one or more outliers;

generate an improvement datum associated with the one or more outlier modules as a function of the one or more outliers and the previous member data, wherein the improvement datum is associated with a change in score of a first outlier selected on a current iteration compared with a second outlier selected on a previous iteration, wherein the improvement datum is associated with at least one of: a change in a quantitative element associated with the one or more outliers, a first indication associated with an improvement in a base deviation, and second indication associated with an increase in the base deviation;

modify the system data as a function of the one or more outliers; and modify the graphical user interface as a function of the one or more outlier modules.

2. The apparatus of claim 1, wherein each data profile of the one or more data profiles further comprises a milestone datum.

3. The apparatus of claim 1, wherein generating the one or more base standards comprises generating the one or more base standards as a function of system data.

4. The apparatus of claim 1, wherein generating the one or more base standards comprises generating the one or more base standards as a function of a web crawler.

5. The apparatus of claim 1, wherein at least one of the one or more outlier modules comprises the base deviation, further comprising:

a lookup table configured to retrieve the quantitative element, wherein the lookup table is configured to replace a runtime computation.

6. The apparatus of claim 1, wherein selecting one or more outliers from the system data comprises:

sorting the system data into one or more base categorizations;

comparing the base categorizations to the one or more base standards; and selecting one or more outliers as a function of the comparison.

7. The apparatus of claim 6, wherein sorting the system data into the one or more base categorizations comprises classifying the system data to the one or more base categorizations using a base classifier.

8. The apparatus of claim 1, wherein modifying the system data as a function of the one or more outliers comprises:

modifying the one or more data profiles to include the one or more outliers and the one or more outlier modules; and transmitting the one or more data profiles to a database.

9. A method for entity oversight, the method comprising:

receiving, by one or more wearable devices communicatively connected to at least a processor, user-specific health data to be represented as a physical health status;

collecting, by the at least a processor, system data, wherein the system data comprises one or more data profiles, wherein each data profile of the one or more data profiles comprises at least previous member data, and wherein the at least previous member data comprises previous iterations of the one or more data profiles;

generating, by the at least a processor, one or more base standards, wherein data profiles within a predetermined threshold are removed before the one or more base standards are generated;

selecting, by the at least a processor, one or more outliers from the system data as a function of the one or more base standards;

updating the previous member data with the one or more selected outliers;

generating by the at least a processor, one or more outlier modules for each data profile of the one or more data profiles as a function of the selection, wherein generating the one or more outlier modules comprises:

receiving outlier training data correlating a plurality of outliers to a plurality of outlier modules, wherein the outlier training data comprises previous member data updated with the one or more selected outliers;

preconditioning the outlier training data to minimize error in an outlier machine learning model, wherein preconditioning comprises at least one of up sampling and down sampling to balance data classes;

training an outlier machine learning model as a function of the outlier training data; and generating one or more outlier modules as a function of the one or more outliers;

generating an improvement datum associated with the one or more outlier modules as a function of the one or more outliers and the previous member data, wherein the improvement datum is associated with a change in score of a first outlier selected on a current iteration compared with a second outlier selected on a previous iteration, wherein the improvement datum is associated with at least one of: a change in a quantitative element associated with the one or more outliers, a first indication associated with an improvement in a base deviation, and second indication associated with an increase in the base deviation;

modifying, by the at least a processor, the system data as a function of the one or more outliers; and modifying, by the at least a processor, a graphical user interface communicatively connected to the at least a processor as a function of the one or more outlier modules.

10. The method of claim 9, wherein each data profile of the one or more data profiles further comprises a milestone datum.

11. The method of claim 9, wherein generating, by the at least a processor, the one or more base standards comprises generating the one or more base standards as a function of system data.

12. The method of claim 9, wherein generating, by the at least a processor, the one or more base standards comprises generating the one or more base standards as a function of a web crawler.

13. The method of claim 9, wherein at least one of the one or more outlier modules comprises the base deviation, further comprising:

retrieving, by a lookup table, the quantitative element, wherein the lookup table is configured to replace a runtime computation.

14. The method of claim 9, wherein selecting, by the at least a processor, one or more outliers from the system data comprises:

sorting the system data into one or more base categorizations;

comparing each element within the one or more base categorizations to the one or more base standards; and selecting one or more outliers as a function of the comparison.

15. The method of claim 14, wherein sorting, by the at least a processor, the system data into one or more base categorizations comprises classifying the system data to one or more base categorizations.

16. The method of claim 11, wherein modifying, by the at least a processor, the system data as a function of the one or more outliers comprises:

modifying the one or more data profiles to include the one or more outliers and the one or more outlier modules; and transmitting one or more data profiles to a database.

* * * * *